US010445909B2

(12) United States Patent
Yasutomi

(10) Patent No.: US 10,445,909 B2
(45) Date of Patent: Oct. 15, 2019

(54) IMAGE PROCESSING APPARATUS THAT GENERATES A WIDE ANGLE IMAGE USING A PLURALITY OF IMAGES, AND RELATED CONTROL METHOD AND STORAGE MEDIUM

(71) Applicant: CANON KABUSHIKI KAISHA, Tokyo (JP)

(72) Inventor: Takeshi Yasutomi, Hino (JP)

(73) Assignee: Canon Kabushiki Kaisha, Tokyo (JP)

( * ) Notice: Subject to any disclaimer, the term of this patent is extended or adjusted under 35 U.S.C. 154(b) by 192 days.

(21) Appl. No.: 15/358,548

(22) Filed: Nov. 22, 2016

(65) Prior Publication Data
US 2017/0154453 A1 Jun. 1, 2017

(30) Foreign Application Priority Data
Nov. 30, 2015 (JP) .................................. 2015-233194

(51) Int. Cl.
*G06T 11/60* (2006.01)
*G06T 3/40* (2006.01)

(52) U.S. Cl.
CPC ............ *G06T 11/60* (2013.01); *G06T 3/4038* (2013.01); *G06T 2207/20221* (2013.01)

(58) Field of Classification Search
CPC ..................................................... G06T 11/60
USPC ....................................................... 382/284
See application file for complete search history.

(56) References Cited

U.S. PATENT DOCUMENTS

| 6,809,758 | B1 * | 10/2004 | Jones ..................... | H04N 5/145 348/208.99 |
| 7,593,042 | B2 * | 9/2009 | Cutler .................. | H04N 5/2259 348/14.08 |
| 2010/0209009 | A1 * | 8/2010 | Matsunaga ........ | H04N 5/23232 382/224 |
| 2011/0149016 | A1 * | 6/2011 | Kimura .................. | H04N 5/232 348/36 |
| 2012/0081510 | A1 * | 4/2012 | Miyamoto ......... | H04N 5/23238 348/36 |
| 2012/0105578 | A1 * | 5/2012 | Ohmiya ............. | H04N 5/23238 348/36 |

(Continued)

FOREIGN PATENT DOCUMENTS

JP 5115731 B2 1/2013

*Primary Examiner* — Justin P. Misleh
(74) *Attorney, Agent, or Firm* — Venable LLP

(57) ABSTRACT

An image processing apparatus detects a positional displacement between a predetermined area cropped from adjacent images, among a plurality of images, based on at least one of angular velocity information and posture information of an image sensor, calculates an amount of a rotation component required for compositing the adjacent images, and sets a predetermined threshold based on the at least one of the angular velocity information and the posture information. The apparatus corrects the predetermined area based on the predetermined threshold if the amount of the rotation component is greater than the predetermined threshold, and corrects the predetermined area based on the calculated amount of the rotation component if the amount of the rotation component is equal to or less than the predetermined threshold. Then, the apparatus generates a wide angle image by compositing the plurality of corrected predetermined areas cropped from the plurality of images.

9 Claims, 6 Drawing Sheets

(56) References Cited

U.S. PATENT DOCUMENTS

2013/0314402 A1\* 11/2013 Furumura ............. G03B 35/02
345/419

\* cited by examiner

*FIG. 3A*  *FIG. 3B*  *FIG. 3C*  *FIG. 3D*
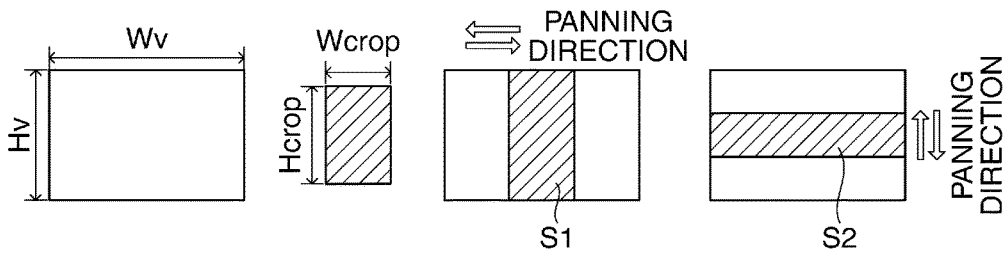
*FIG. 4A*
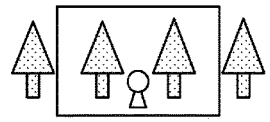
*FIG. 4B*
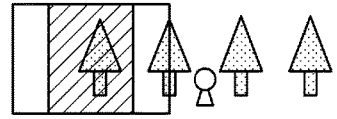
*FIG. 4C*
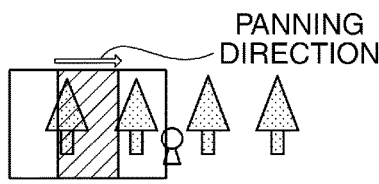
*FIG. 4D*
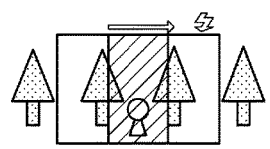
*FIG. 4E*
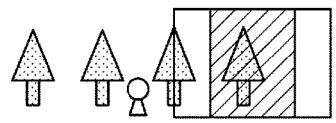
*FIG. 4F*
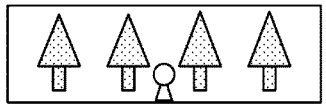

PANNING DIRECTION ⇨

FIRST FRAME

SECOND FRAME

THIRD FRAME

COMPOSITE IMAGE

FIRST FRAME

PANNING DIRECTION ⇨

SECOND FRAME

THIRD FRAME

COMPOSITE IMAGE

IMAGE PROCESSING APPARATUS THAT GENERATES A WIDE ANGLE IMAGE USING A PLURALITY OF IMAGES, AND RELATED CONTROL METHOD AND STORAGE MEDIUM

This application claims the benefit of Japanese Patent Application No. 2015-233194, filed on Nov. 30, 2015, which is hereby incorporated by reference herein in its entirety.

BACKGROUND OF THE INVENTION

Field of the Invention

The present invention relates to an image processing apparatus, a control method for an image processing apparatus, and a storage medium storing a control program for an image processing apparatus, and in particular, relates to an image processing technique that composites a plurality of static images taken by panning photographing using an image pickup apparatus to form a wide angle image (hereafter referred to as a "panoramic image").

Description of the Related Art

Japanese Patent Publication No. 5115731 describes a method that takes a plurality of static images continuously by panning an image pickup apparatus, and that composites a panoramic image from the taken images.

The method disclosed in Japanese Patent Publication No. 5115731 includes compositing a panoramic image from the taken images on the basis of the first image, among the taken images. Accordingly, when the images are taken continuously in a tilted state in which the image pickup apparatus is inclined downward a little, for example, the composited images fall gradually from the first image toward the last image. This causes a problem that narrows an image area available as a panoramic image, narrows a field angle in spite of performing panoramic photographing, and generates an unnatural image.

SUMMARY OF THE INVENTION

The present invention provides an image processing apparatus that is capable of compositing a natural panoramic image from a plurality of images taken by an image pickup apparatus while panning.

In a first aspect, the present invention provides an image processing apparatus including a clipping unit configured to clip a predetermined area from each of a plurality of images that are continuously photographed while moving an image pickup unit in a predetermined direction, a detection unit configured to detect a positional displacement between adjacent images among a plurality of areas clipped with the clipping unit, a correction unit configured to correct the positional displacement between the adjacent images that is detected with the detection unit according to a predetermined threshold, and a compositing unit configured to generate a wide angle image by compositing the adjacent images in the plurality of areas of which the positional displacement is corrected with the correction unit in order of photographing.

In a second aspect, the present invention provides a control method for an image processing apparatus including a clipping step of clipping a predetermined area from each of a plurality of images that are continuously photographed while moving an image pickup unit in a predetermined direction, a detecting step of detecting a positional displacement between adjacent images among a plurality of areas clipped in the clipping step, a calculating step of calculating a rotation component required for compositing the images for each of the adjacent images in the plurality of areas based on the positional displacement that is detected in the detecting step, a correcting step of correcting the positional displacement between the adjacent images that is detected in the detecting step at a rotation angle according to the rotation component when the rotation component is equal to or less than a predetermined threshold and of correcting the positional displacement at the rotation angle according to the predetermined threshold when the rotation component is greater than the predetermined threshold, and a compositing step of generating a wide angle image by compositing the adjacent images in the plurality of areas of which the positional displacement is corrected in the correcting step in order of photographing.

In a third aspect, the present invention provides a non-transitory computer-readable storage medium storing a control program causing a computer to execute the control method according to the second aspect of the present invention.

According to the present invention, a natural panoramic image is composited from the plurality of images taken by the image pickup apparatus while panning.

Further features of the present invention will become apparent from the following description of exemplary embodiments with reference to the attached drawings.

BRIEF DESCRIPTION OF THE DRAWINGS

FIG. 3A through FIG. 3D are views describing a relationship between a direction in which the digital camera shown in FIG. 1 pans and a clipping area clipped out from image data of a taken image.

FIG. 4A through FIG. 4F are views describing a correlation between a flow of a panoramic-image compositing process by the digital camera shown in FIG. 1 and image data.

DESCRIPTION OF THE EMBODIMENTS

Hereafter, embodiments according to the present invention will be described in detail with reference to the drawings.

Figure 1:
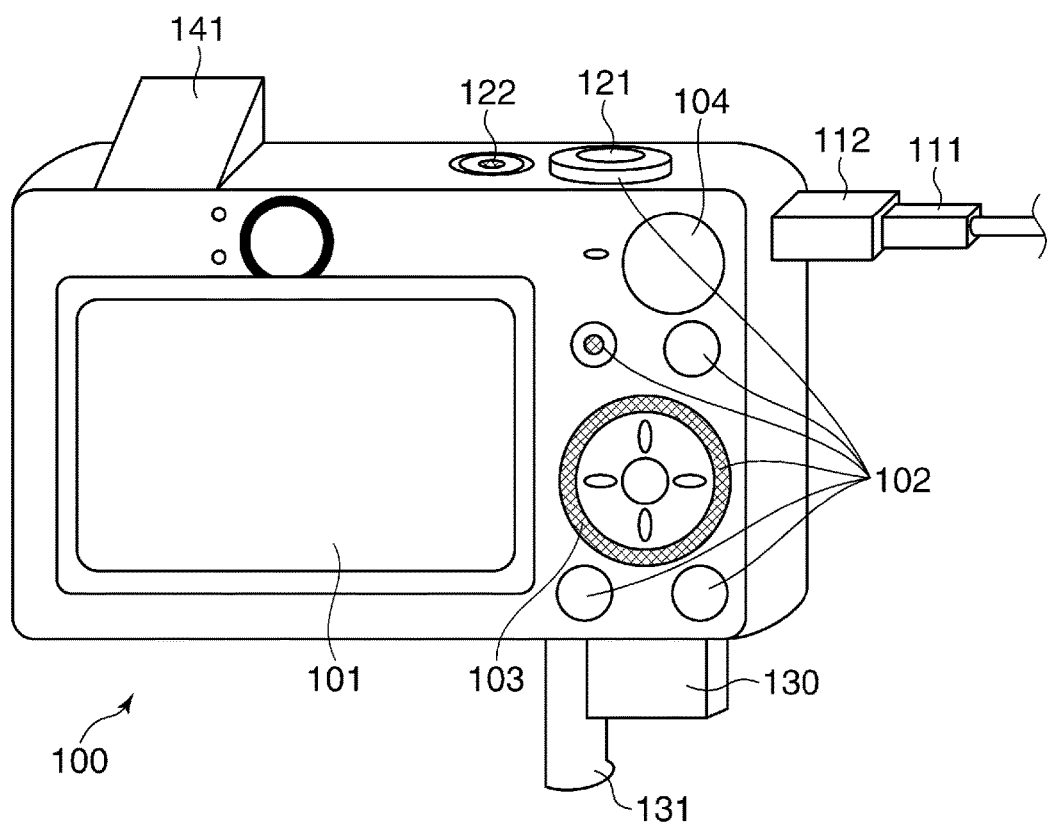
FIG. 1 is a back perspective view schematically showing a configuration of a digital camera as an example of an image processing apparatus according to an embodiment of the present invention.

FIG. 1 is a back perspective view schematically showing a configuration of a digital camera 100 as an example of an image processing apparatus according to an embodiment of the present invention.

A display unit 101, an operation unit 102, a mode change switch 104, and a controller wheel 103 are disposed at the back of the digital camera 100. The display unit 101 displays an image and various kinds of information. The operation unit 102 consists of operation members, such as various switches and buttons, that receive various operations by a user. The mode change switch 104 changes a photographing mode, etc. The controller wheel 103 is rotationally operatable. A shutter button 121 that instructs photographing, a power switch 122 that changes ON/OFF of power of the digital camera 100, and an electric flash 141 that irradiates an object with a flash light are disposed on the top of the digital camera 100.

The digital camera 100 is connectable to an external apparatus via a connection cable 111 and a connector 112 and outputs image data (static image data, moving image data) to the external apparatus. A storage medium slot (not shown) that is opened and closed with a lid 131 is disposed at the bottom of the digital camera 100 so as to enable insertion and removal of a storage medium 130 to the storage medium slot.

The storage medium 130 stored in the storage medium slot is able to communicate with a system control unit 210 (see FIG. 2) of the digital camera 100. It should be noted that the storage medium 130 is not limited to a memory card, etc., that enables insertion and removal to the storage medium slot. The storage medium 130 may be an optical disk, like a rewritable digital versatile disk (DVD-RW), or a magnetic disk, like a hard disk, or may be built into the body of the digital camera 100.

Figure 2:
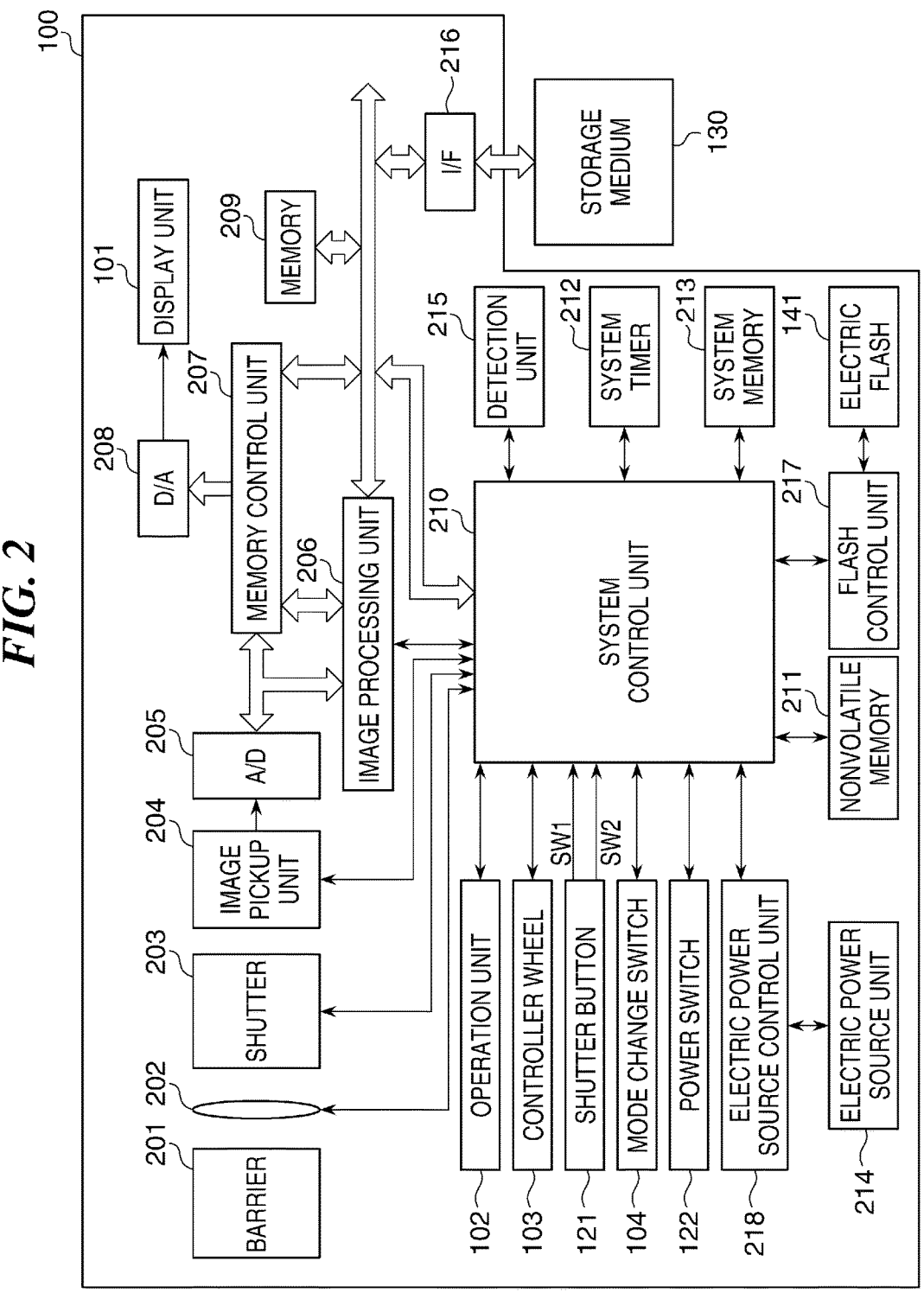
FIG. 2 is a block diagram showing a hardware configuration of the digital camera shown in FIG. 1.

FIG. 2 is a block diagram showing a hardware configuration of the digital camera 100. The digital camera 100 is provided with a barrier 201, a photographing lens 202, a shutter 203, and an image pickup unit 204. The barrier 201 prevents defilement and breakage of an image pickup optical system by covering the image pickup optical system. The photographing lens 202 consists of lens groups, including a zoom lens and a focusing lens, and constitutes the image pickup optical system. The shutter 203 has a diaphragm function and controls an exposure amount to the image pickup unit 204. The image pickup unit 204 is an image pickup device that converts an optical image into an electrical signal (analog signal), and is an image sensor, such as a charge-coupled device (CCD) sensor that has a Bayer-arrangement configuration in which pixels of the red, green, and blue color model (RGB) are arranged regularly, and a complementary metal oxide semiconductor (CMOS) sensor. It should be noted that the shutter 203 may be a mechanical shutter, or may be an electronic shutter that controls a storage time by controlling a reset timing of the image pickup device.

The digital camera 100 is provided with an analog/digital (A/D) converter 205, an image processing unit 206, a memory control unit 207, a digital/analog (D/A) converter 208, a memory 209, and the system control unit 210. The image pickup unit 204 outputs an analog signal to the A/D converter 205. The A/D converter 205 converts the obtained analog signal into image data that consists of a digital signal, and outputs the image data to the image processing unit 206 or the memory control unit 207.

The image processing unit 206 applies correction processes, such as pixel interpolation and a shading correction, a white balance process, a gamma correction process, a color conversion process, etc., to the data obtained from the A/D converter 205 or the memory control unit 207. Moreover, the image processing unit 206 achieves an electronic zoom function by clipping the image or applying a magnification varying process to the image. Furthermore, the image processing unit 206 performs a predetermined calculation process using the image data of the taken image, and the system control unit 210 performs an exposure control and a distance measuring control based on the calculation result obtained. For example, the system control unit 210 performs an auto-focusing (AF) process of a through the lens (TTL) system, an automatic exposure (AE) process, and a pre-emission of flash (EF) process. The image processing unit 206 performs a predetermined calculation process using the image data of the taken image, and the system control unit 210 performs an automatic white balance (AWB) process of a TTL system using the calculated result obtained.

The image processing unit 206 has an image compositing circuit that composites a panoramic image from a plurality of images. The image compositing circuit performs not only simple addition composition and addition average composition, but also comparison bright composition or comparison dark composition that generates image data of one image by selecting a pixel having the brightest value or the darkest value in each region of image data to be composited. It should be noted that the image compositing circuit may be configured as an image composition unit that is separate from the image processing unit 206, and that the system control unit 210 may bear the function of the image compositing circuit.

The image data output from the A/D converter 205 is written into the memory 209 via the image processing unit 206 and the memory control unit 207, or via the memory control unit 207. The memory 209 serves as a display image memory (video memory) that stores image data displayed on the display unit 101. The memory 209 has sufficient memory capacity for storing a predetermined number of still images, panoramic images (wide angle images), video images of predetermined time, voice data, etc. It should be noted that the memory 209 is used as a working area to which a program that the system control unit 210 reads from a nonvolatile memory 211 is developed.

The display image data (digital data) stored in the memory 209 is transmitted to the D/A converter 208. The D/A converter 208 converts the received digital data into an analog signal, and supplies the analog signal to the display unit 101. Accordingly, an image is displayed on the display unit 101. The display unit 101 is a display device, such as a liquid crystal display or an organic electroluminescent (EL) display, and displays an image on the basis of the analog signal from the D/A converter 208. The system control unit 210 switches ON/OFF of the display of an image on the display unit 101. Power consumption is reduced by turning OFF the display of an image. It should be noted that an electronic view finder function, which displays a through image, is achieved by converting a digital signal that is accumulated in the memory 209 through the A/D converter 205 from the image pickup unit 204 into an analog signal by the D/A converter 208, and by sequentially displaying the analog signal on the display unit 101.

The digital camera 100 is provided with the nonvolatile memory 211, a system timer 212, a system memory 213, a detection unit 215, and a flash control unit 217. The nonvolatile memory 211 is a memory that eliminates and stores data electrically (for example, an electrically erasable programmable read-only memory), and stores programs that the system control unit 210 runs, constants for operations, etc. Moreover, the nonvolatile memory 211 has an area in which system information is stored and an area in which user set information is stored. The system control unit 210 reads various kinds of information and settings that are stored in the nonvolatile memory 211 at the start-up of the digital camera 100, and restores the various kinds of information and settings.

The system control unit 210 has a central processing unit (CPU) and controls the entire operation of the digital camera 100 by executing various program codes stored in the nonvolatile memory 211. It should be noted that programs, constants for operations, variables, etc., that the system control unit 210 reads from the nonvolatile memory 211 are developed onto the system memory 213. The system memory 213 employs a random access memory (RAM). Furthermore, the system control unit 210 controls displaying by controlling the memory 209, the D/A converter 208, and the display unit 101. The system timer 212 measures time periods used for various control operations and a time of a built-in clock. The flash control unit 217 controls an emission of the electric flash 141 corresponding to a brightness of an object. The detection unit 215 includes a gyroscope and a sensor, and obtains angular velocity information, posture information, etc., of the digital camera 100. It should be noted that the angular velocity information includes the information of an angular velocity and an angular acceleration at the time of the panning photographing by the digital camera 100. Moreover, the posture information includes information of the inclination of the digital camera 100 in a horizontal direction.

The display unit 101, the operation unit 102, the controller wheel 103, the shutter button 121, the mode change switch 104, the power switch 122, and the electric flash 141 that are shown in FIG. 2 are the same as those described with reference to FIG. 1.

Various operating members that constitute the operation unit 102 are used for selecting various function icons displayed on the display unit 101, for example. When a predetermined function icon is selected, functions are allocated to the operating members in each case. That is, the operating members of the operation unit 102 act as various feature buttons. The function buttons include an end button, a back button, a next image button, a jump button, a stop down button, an attribute changing button, a DISP button, etc. For example, when the menu button is pressed, a menu screen for various settings is displayed on the display unit 101. A user is able to operate intuitively by using the menu screen displayed on the display unit 101, a four direction (upper/lower/right/left) button, and a SET button.

The controller wheel 103, as an operating member that allows a rotating operation, is used with the four direction button when a selection item is designated. The rotating operation of the controller wheel 103 generates an electrical pulse signal corresponding to an operation amount (angle of rotation, rotation counts, etc.). The system control unit 210 analyzes this pulse signal, and controls each part of the digital camera 100.

The shutter button 121 has a first switch SW1 and a second switch SW2. The first switch SW1 turns ON when the shutter button 121 is pressed halfway, and accordingly, a signal that instructs a photographing preparation is transmitted to the system control unit 210. When receiving the signal that indicates ON of the first switch SW1, the system control unit 210 starts operations of an AF process, an AE process, an AWB process, an EF process, etc. The second switch SW2 turns ON when the shutter button 121 is fully pressed, and accordingly, a signal that instructs a photographing start is transmitted to the system control unit 210. When receiving the signal that indicates ON of the second switch SW2, the system control unit 210 performs a series of the photographing operation from reading of the signal from the image pickup unit 204 to writing of the image data to the storage medium 130.

The mode change switch 104 changes the operation mode of the digital camera 100 among the various modes, such as a still image photographing mode, a moving image capturing mode, and a reproducing mode. The still image photographing mode includes a panoramic image compositing mode in which a panoramic image is composited by panning photographing beside an auto photographing mode, etc.

The digital camera 100 is provided with an electrical power source unit 214 and an electrical power source control unit 218. The electrical power source unit 214, which supplies the power to the electrical power source control unit 218, is a primary battery, such as an alkaline battery or a lithium (Li) battery, a secondary battery, such as a nickel-cadmium (NiCd) battery, a nickel metal hydride (NiMH) batter, an Li battery, an alternating current (AC) adaptor, or the like. The electrical power source control unit 218 detects the presence or the absence of the battery in the electrical power source unit 214, the type of the battery, battery residue, etc., and supplies the required voltage to the portions, including the storage medium 130, during the required period on the basis of the detection result and instructions from the system control unit 210.

The digital camera 100 is provided with a storage-medium interface (I/F) 216 that enables communication between the storage medium 130 and the system control unit 210 when the storage medium 130 is mounted in the storage medium slot (not shown). Since the detail of the storage medium 130 has been already described with reference to FIG. 1, its description is omitted here.

Next, a panning-photographing method and a method of compositing a panoramic image from a plurality of taken images will be described. First, a process for clipping a predetermined area from image data of a taken image in order to composite a panoramic image will be described.

FIG. 3A through FIG. 3D are views describing a relationship between a direction in which the digital camera 100 in FIG. 1 pans and a clipping area clipped out from image data. FIG. 3A shows an effective image area of the image pickup device (image sensor) that the image pickup unit 204 has, "Wv" is a valid pixel number in the horizontal direction, and "Hv" is a valid pixel number in a vertical direction. FIG. 3B shows the clipping area clipped out from the image data of the taken image, "Wcrop" is a clipping pixel number in the horizontal direction, and "Hcrop" is a clipping pixel number in the vertical direction.

FIG. 3C is a view showing a clipping area in the image data in a case in which the image is taken by panning the digital camera 100 in the horizontal direction shown by an arrow. A hatching area 51 in FIG. 3C shows the clipping area from the image data. The clipping from the image data in the horizontal direction satisfies "Wv>Wcrop", and the clipping from the image data in the vertical direction satisfies "Hv=Hcrop". FIG. 3D is a view showing a clipping area in the image data in a case in which the image is taken by panning the digital camera 100 in the vertical direction shown by an arrow. A hatching area S2 in FIG. 3D shows the clipping area from the image data. The clipping from the image data in the horizontal direction satisfies "Wv=Wcrop", and the clipping from the image data in the vertical direction satisfies "Hv>Hcrop".

A clipping area in image data of a taken image may differ for every image data. Moreover, the clipping areas in the image data at the time of starting the panning and the image data at the time of finishing the panning may be greater than that in the other image data in order to widen a field angle. The clipping area in the image data is determined on the basis of the difference between the angle of the digital camera 100 immediately after photographing and the angle of the digital camera 100 at the previous frame, etc., for example. Since only the image data required for a panoramic-image compositing process are clipped and saved, the memory capacity of the memory 209 is reduced.

Next, the panoramic-image compositing method will be described. The system control unit 210 reads the image data that were clipped and saved at the time of the panning photographing from the memory 209, and detects positional displacements between the images corresponding to the read image data. The positional displacement is detectable by a method of dividing the clipping area into small blocks of an optional size, computing a corresponding point at which a sum of absolute difference (SAD) of luminance values is minimized for every small block, and computing a motion vector, etc. It should be noted that the motion vector may be calculated using angular velocity information, posture information, etc., that are detected by the detection unit 215. Subsequently, the system control unit 210 corrects the positional displacements between the images in the clipping areas on the basis of the motion vector that is found between the images in the adjacent clipping areas, and composites the overlapped parts in the clipping areas by weighted addition, etc.

FIG. 4A through FIG. 4F are views describing a correlation between a flow of the panoramic-image compositing process and image data. In FIG. 4A through FIG. 4F, dot-hatching areas schematically show roadside trees in a field, and bias-hatching areas show clipping areas in the image data. FIG. 4A shows a state in which the first switch SW1 of the shutter button 121 is turned ON. A user approximately focuses the camera on the center of the panoramic image to be composited. FIG. 4B shows a position in which the second switch SW2 of the shutter button 121 is turned ON. The user sets the field at one end of the panoramic image to be composited. FIG. 4C schematically shows a state in which the user is continuously photographing under the first photographing condition while panning the digital camera 100 toward the other end of the panoramic image to be composited. FIG. 4D shows a state in which the user photographs under a second photographing condition (for example, a photographing condition that emits the electric flash 141) while panning the digital camera 100. FIG. 4E shows a state in which the panning of the digital camera 100 has been performed to the set angle and the continuous photographing is completed. FIG. 4F shows the panoramic image composited from a plurality of photographed images (static images).

A conventional panoramic-image compositing method and the panoramic image compositing method of the embodiment when the panning of the digital camera 100 is performed in a tilted state in which the optical axis of the digital camera 100 is inclined downward a little with respect to a normal position in which the optical axis becomes horizontal are described with reference to FIG. 5A through FIG. 5D and FIG. 6A through FIG. 6D.

FIG. 5A through FIG. 5D are views describing the conventional panoramic-image compositing method. When the first switch SW1 turns ON, a photographing operation starts. When the second switch SW2 turns ON, a first image is photographed. In a first image shown in FIG. 5A, a tree 501 that is indicated schematically is located at a position deviated from the center of the screen, and is photographed in a slightly inclined state.

Continuously, a second image is photographed while panning the digital camera 100 rightward in the drawing. In the second image, shown in FIG. 5B, the tree 501 is further deviated from the center of the screen, and is photographed in a further inclined state as compared with the first image. Similarly, a third image is photographed. In the third image, shown in FIG. 5C, the tree 501 further approaches the edge of the screen, and is photographed in a further inclined state.

Figure 5A:
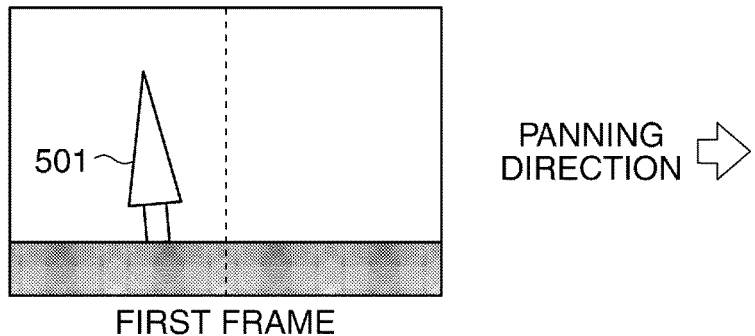
FIG. 5A through FIG. 5D are views describing a conventional panoramic-image compositing method.
Figure 5B:
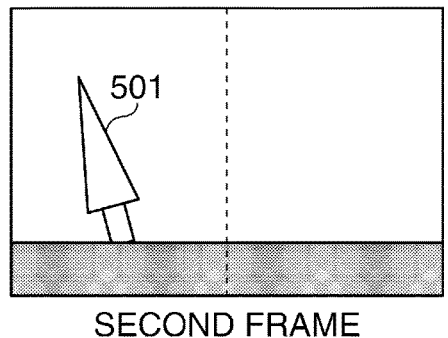
Figure 5C:
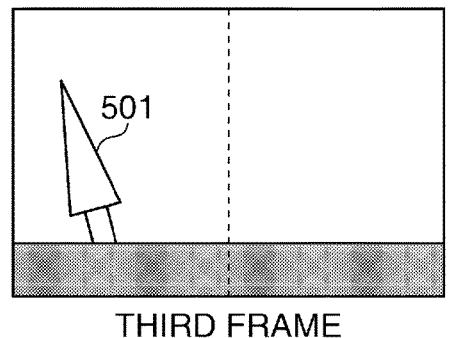
Figure 5D:
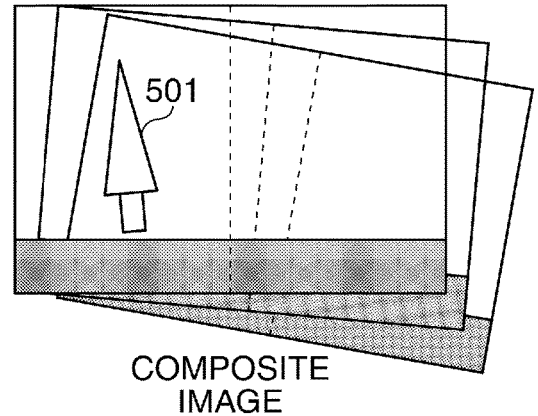

When the panoramic image is composited from the three photographed images, as described with reference to FIG. 3A through FIG. 3D, the conventional technique detects the positional displacements of the images on the basis of the portions of the tree 501. FIG. 5D schematically shows a composite image that is formed by compositing the first through third images according to the conventional compositing method. Since the photographed images are composited in the downwardly inclined states of which inclinations become larger in the order of photographing, the composite image becomes unnatural. The embodiment of this invention solves this problem.

Figure 6A:
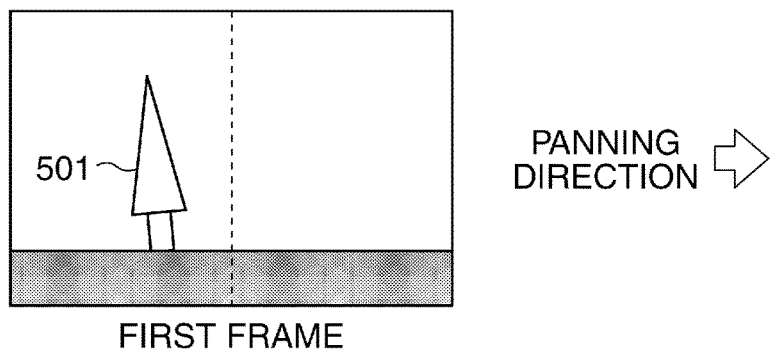
FIG. 6A through FIG. 6D are views describing a panoramic-image compositing method according to the embodiment of the present invention.
Figure 6B:
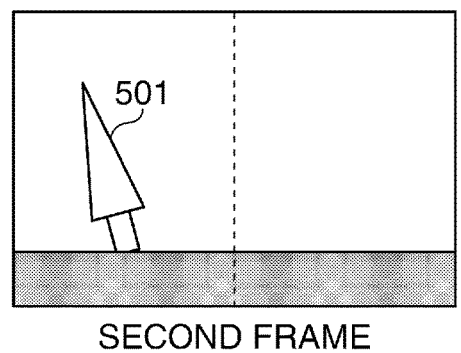
Figure 6C:
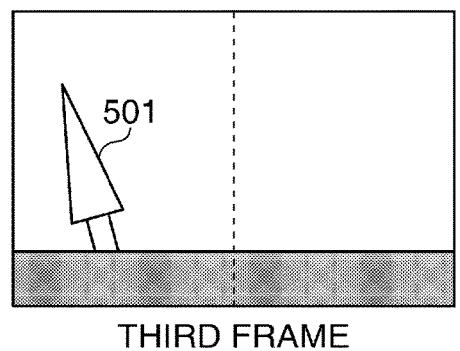

FIG. 6A through FIG. 6D are views describing the panoramic-image compositing method according to the embodiment of the present invention. Photographing by the digital camera 100 shall be performed under the same condition as the photographing conditions described with reference to FIG. 5A through FIG. 5D. Accordingly, the first image shown in FIG. 6A is the same as the first image shown in FIG. 5A, the second image shown in FIG. 6B is the same as the second image shown in FIG. 5B, and the third image shown in FIG. 6C is the same as the third image shown in FIG. 5C. The system control unit 210, however, obtains inclination information as one of angular velocity information and posture information of the digital camera 100 from the detection unit 215 simultaneously with the photographing of the first image.

Figure 6D:
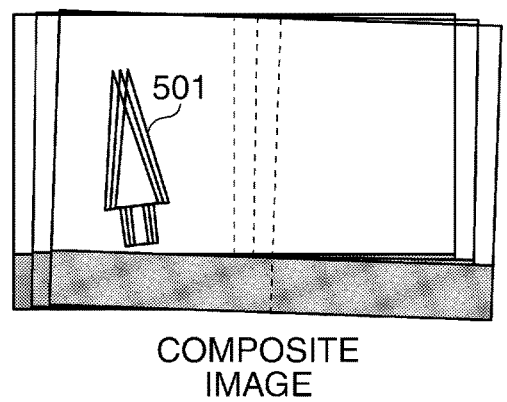

FIG. 6D schematically shows a composite image that is formed by compositing the first through third images by the compositing method concerning the embodiment. In the embodiment, an amount of a rotation component required for compositing the images is calculated for every image on the basis of a motion vector that is found by comparing the photographed images. It should be noted that the amount of the rotation component is calculated using at least one of the angular velocity information and the posture information of the digital camera 100 obtained through the detection unit 215 when the photographing operation starts. The rotation component is calculated by the system control unit 210, for example. Then, the image processing unit 206 composites the images while correcting the positional displacement by setting a predetermined threshold to the calculated rotation component. Since this reduces rotation of an image and mitigates the problem that images are composited in the downwardly inclined states, a natural panoramic image is composited with a larger field angle.

Figure 7:
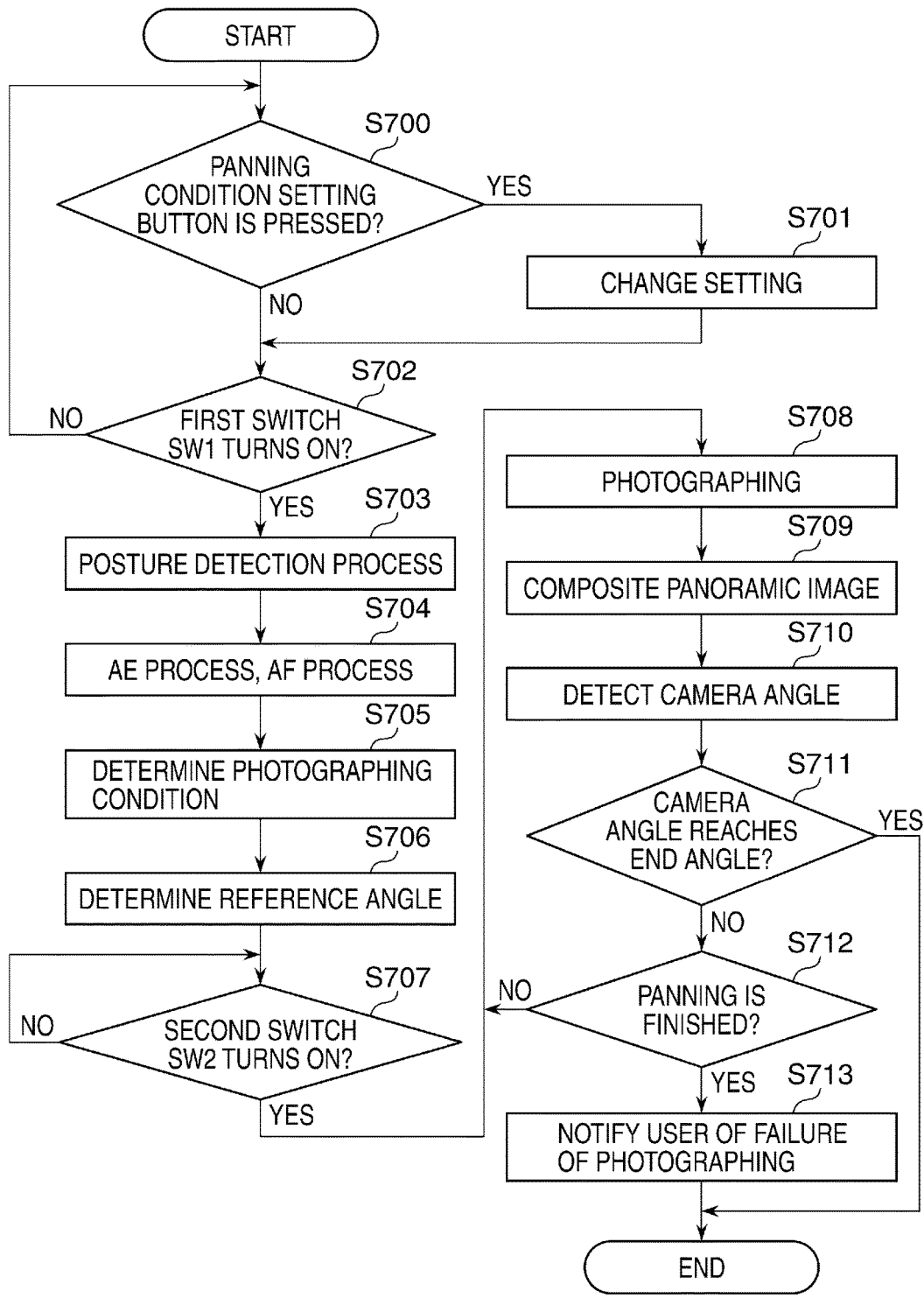
FIG. 7 is a flowchart of the panoramic-image compositing process according to the embodiment.

FIG. 7 is a flowchart of the panoramic-image compositing process according to the embodiment. The panoramic-image compositing process concerning the embodiment is performed when a user selected a panoramic image compositing mode with the mode change switch 104. A process in each step in FIG. 7 is achieved when the system control unit 210 develops a predetermined program read from the nonvolatile memory 211 onto the system memory 213 and controls an operation and a process of each portion constituting the digital camera 100.

In step S700, the system control unit 210 determines whether a panning conditioning button has been pressed by an operation of the operation unit 102. It should be noted that the panning conditioning button is one of the function buttons achieved by the operation unit 102. When the panning conditioning button has been pressed (YES in step S700), the system control unit 210 proceeds with the process to step S701. When the panning conditioning button has not been pressed (NO in step S700), the process proceeds to step S702.

The system control unit 210 receives a change of the photographing conditions of the panning photographing (a direction, an angle, etc., of panning) by the user in step S701, stores the received conditions to the nonvolatile memory 211, and then proceeds with the process to step S702. It should be noted that a default setting condition is applied in a first panning photographing in a case in which the panning conditioning button is not pressed.

In step S702, the system control unit 210 determines whether the first switch SW1 of the shutter button 121 has been turned ON. When the first switch SW1 has been turned ON (YES in step S702), the system control unit 210 proceeds with the process to step S703. On the other hand, when the switch SW1 has not been turned ON (NO in step S702), the process returns back to step S700.

In step S703, the system control unit 210 performs a posture detection process of the digital camera 100 by the detection unit 215, and saves a detection result (inclination information) to the system memory 213 (or the memory 209). In the following step S704, the system control unit 210 performs an AE process and an AF process. In the following step S705, the system control unit 210 determines the photographing conditions (exposure, photographing sensitivity, WB, etc.) on the basis of the result of the AE process in step S704. It should be noted that a photographing process is performed in a later step S708 in a state in which the photographing lens 202 is held at the lens position at which the lens focuses on an object by the AF process in step S704.

In the following step S706, the system control unit 210 stores the position of the digital camera 100 at which the first switch SW1 has been pressed to the system memory 213 (or the memory 209) as reference angles of the digital camera 100 in the panning photographing. It should be noted that the reference angles of the digital camera 100 in the panning direction and the direction that intersects perpendicularly with the panning direction are stored.

In the next step S707, the system control unit 210 determines whether the second switch SW2 has been turned ON. When the second switch SW2 has been turned ON (YES in step S707), the system control unit 210 proceeds with the process to step S708. When the second switch SW2 has not been turned ON (NO in step S707), the system control unit 210 repeats the determination in step S707 (waits until the second switch SW2 is turned ON).

In step S708, the system control unit 210 performs the photographing process (takes one image) by controlling the parts of the digital camera 100. Then, in step S709, the system control unit 210 clips the image data photographed under the set-up panning condition in a strip form corresponding to the panning direction by the image processing unit 206, and composites a panoramic image by compositing image data successively. At this time, the panoramic image is composited by compositing images so that an image in a strip-formed clipping area that is clipped from the image obtained by the current photographing process is added to the edge of the composite image that has been obtained by the previous photographing processes.

In that case, the images are composited while correcting the positional displacements as described with reference to FIG. 6A to FIG. 6D. Specifically, when the rotation component of the image in the clipping area calculated from the motion vector that is found by comparing the images is equal to or less than the predetermined threshold, the images are composited so that the image in the new clipping area is added to the composite image until the present time at the rotation angle according to the rotation component. On the other hand, when the rotation component of the image in the clipping area is greater than the predetermined threshold, the images are composited so that the image in the new clipping area is added to the composite image until the present time at the rotation angle according to the threshold. The image data of the panoramic image composited in such a manner is saved in the memory 209.

It should be noted that the threshold may be set up on the basis of the posture information (the inclination information) of the digital camera 100 detected just before starting the photographing, or may be set up on the basis of the motion vector, the angular velocity information, or the posture information calculated during the continuous photographing. Moreover, the threshold may be changed for every image frame on the basis of the motion vector, the angular velocity information, or the posture information during the continuous photographing. On the other hand, the threshold set up once may not be changed during the continuous photographing. The threshold is set up by the system control unit 210.

Subsequently, the system control unit 210 detects an angle of the digital camera 100 in the panning direction (hereafter referred to as a "camera angle") in step S710. Then, the system control unit 210 determines whether the detected camera angle reaches a panning end angle in step S711. When the camera angle reaches the panning end angle (YES in step S711), the system control unit 210 finishes this process. When the camera angle does not reach the panning end angle (NO in step S711), the process proceeds to step S712. It should be noted that the determination of YES in step S711 means that the desired panoramic image has been obtained.

In step S712, the system control unit 210 determines whether the panning photographing has been finished on the basis of the camera angle detected in step S710. The determination in step S712 is performed in the panning direction and the direction that intersects perpendicularly with the panning direction. Specifically, the end of the panning in the panning direction is determined on the basis of whether the angle in the panning direction is increasing by comparing the angle of the digital camera 100 of the latest frame with the angle of the digital camera 100 of the previous frame. When the angle in the panning direction is not increasing, it is determined that the panning has been finished. Moreover, the end of the panning in the direction that intersects perpendicularly with the panning direction is determined on the basis of whether an angular difference between the reference angle of the digital camera 100 (detected in step S706) and the angle of the digital camera of the latest frame is greater than a predetermined value. When the angular difference is greater than the predetermined value, it is determined that the panning has been finished.

When determining that the panning has been finished (YES in step S712), the system control unit 210 proceeds the process to step S713, and displays a notice indicating failure of the photographing on the display unit 101 in step S713. Step S713 is the last step of this process. When determining that the panning has not been finished (NO in step S712), the system control unit 210 returns the process to step S708. Accordingly, the continuous photographing in the panning photographing is performed by repeating the process in steps S708 through S712 until the end of the panning photographing.

In this embodiment, when it is determined that the panning has been finished in step S712, the image data of the composite image, which has been generated until the end, is saved in the memory 209 and the panning photographing is finished. Alternatively, when another predetermined condition is satisfied before the camera angle does not reach the panning end angle, the image data of the composite image, which has been generated until then, may be saved in the memory 209, and the panning photographing may be finished. Moreover, when it is determined that the panning has been finished in step S712, the image data of the composite image, which has been generated until then, may be canceled.

Although the embodiment of the invention has been described, the present invention is not limited to the above-mentioned embodiment, and the present invention includes various modifications as long as those modifications do not deviate from the concept of the invention. For example, although the panoramic-image compositing process by the panning of the digital camera 100 is described in the above-mentioned embodiment, a panoramic-image compositing process by tilting (a tilting motion) of the digital camera 100 is executable according to the same process.

Moreover, although the digital camera 100 is taken up as the image processing apparatus according to the present invention, the scope of the invention is not limited to a digital camera. Various electronic apparatuses (a digital video camera, a mobile phone, a personal computer, a game machine, etc.) that have a camera function may be used as the image processing apparatus. Moreover, the image processing apparatus according to the present invention does not necessarily need to contain an image pickup means, and may be configured to obtain a taken image from an image pickup means (camera) that is externally connected. In such a case, the connection means may be wired or wireless. Furthermore, when a plurality of images photographed by panning or tilting of the image pickup means include the angular velocity information and the inclination information of the image pickup means at the time of photographing, the panoramic image is able to be composited from the plurality of images according to the process described with reference to FIG. 6A through FIG. 6D and FIG. 7.

Other Embodiments

The embodiment of the present invention described above can also be realized by a computer of a system or an apparatus that reads out and executes computer executable instructions (e.g., one or more programs) recorded on a storage medium (that may also be referred to more fully as a 'non-transitory computer-readable storage medium') to perform the functions of embodiment described above, and/or that includes one or more circuits (e.g., an application specific integrated circuit (ASIC)) for performing the functions of embodiment described above, and by a method performed by the computer of the system or the apparatus by, for example, reading out and executing the computer executable instructions from the storage medium to perform the functions of embodiment described above and/or controlling the one or more circuits to perform the functions of embodiment described above. The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to an exemplary embodiment, it is to be understood that the invention is not limited to the disclosed exemplary embodiment. The scope of the following claims is to be accorded the broadest interpretation so as to encompass all such modifications and equivalent structures and functions.

What is claimed is:

1. An image processing apparatus comprising:
(A) at least one memory configured to store instructions; and
(B) at least one processor in communication with the at least one memory and configured to execute the instructions:
(a) to perform continuous photographing of a plurality of images using an image sensor while the image sensor moves in a panning direction;
(b) to detect first posture information of the image sensor just before the continuous photographing to produce a detected first posture information;
(c) to crop a predetermined area from each image of the plurality of images to produce a plurality of cropped predetermined areas;
(d) to detect at least one of angular velocity information and second posture information of the image sensor during the continuous photographing to produce a detected at least one of angular velocity information and second posture information of the image sensor;
(e) to detect a positional displacement between each of the plurality of cropped predetermined areas based on the detected at least one of the angular velocity information and the second posture information of the image sensor to produce a detected positional displacement of each of the plurality of cropped predetermined areas;
(f) to calculate an amount of a rotation component of each of the plurality of cropped predetermined areas based on the detected at least one of the angular velocity information and the second posture information of the image sensor to produce a calculated amount of the rotation component;
(g) to set a threshold amount of a rotation component based on one of (i) the detected at least one of the angular velocity information and the second posture information of the image sensor, and (ii) the detected first posture information of the image sensor; and
(h) to generate a wide angle image by compositing the plurality of cropped predetermined areas while correcting the detected positional displacement of each of the plurality of cropped predetermined areas, wherein, in a case in which the amount of the rotation component for a cropped predetermined area, of the plurality of cropped predetermined areas, is greater than the threshold amount of the rotation component, the detected positional displacement of the cropped predetermined area is corrected based on the threshold amount of the rotation component, and, in a case in which the amount of the rotation component for a cropped predetermined area, of the plurality of cropped predetermined areas, is equal to or less than the threshold amount of the rotation component, the detected positional displacement of the cropped predetermined area is corrected based on the amount of the rotation component.

2. The image processing apparatus according to claim 1, wherein the at least one processor further executes the instructions (k) to change the threshold amount of the rotation component based on the detected at least one of the angular velocity information and the second posture information.

3. The image processing apparatus according to claim 1, wherein the at least one processor sets the threshold amount of the rotation component based on (ii) the detected first posture information of the image sensor.

4. A control method of controlling an image processing apparatus, the control method comprising:
   continuously photographing a plurality of images using an image sensor while the image sensor moves in a panning direction;
   detecting first posture information of the image sensor just before the continuous photographing to produce a detected first posture information;
   cropping a predetermined area from each image of the plurality of images to produce a plurality of cropped predetermined areas;
   detecting at least one of angular velocity information and second posture information of the image sensor during the continuous photographing to produce a detected at least one of angular velocity information and second posture information of the image sensor;
   detecting a positional displacement between each of the plurality of cropped predetermined areas based on the detected at least one of the angular velocity information and the second posture information of the image sensor to produce a detected positional displacement of each of the plurality of cropped predetermined areas;
   calculating an amount of a rotation component of each of the plurality of cropped predetermined areas based on the detected at least one of the angular velocity information and the second posture information of the image sensor to produce a calculated amount of the rotation component;
   setting a threshold amount of a rotation component based on one of (a) the detected at least one of the angular velocity information and the second posture information of the image sensor, and (b) the detected first posture information of the image sensor; and
   generating a wide angle image by compositing the plurality of cropped predetermined areas, wherein the compositing includes successively adding, beginning with an initial predetermined cropped area as a preceding predetermined cropped area, each of the plurality of cropped predetermined areas to an edge of the preceding predetermined cropped area while correcting the detected positional displacement of each of the plurality of cropped predetermined areas, wherein, in a case in which the amount of the rotation component for a cropped predetermined area, of the plurality of cropped predetermined areas, is greater than the threshold amount of the rotation component, the detected positional displacement of the cropped predetermined area is corrected by rotating the cropped predetermined area by the threshold amount of the rotation component, and, in a case in which the amount of the rotation component for a cropped predetermined area, of the plurality of cropped predetermined areas, is equal to or less than the threshold amount of the rotation component, the detected positional displacement of the cropped predetermined area is corrected by rotating the cropped predetermined area by the amount of the rotation component.

5. The control method according to claim 4, further comprising changing the threshold amount of the rotation component based on the detected at least one of the angular velocity information and the second posture information.

6. The control method according to claim 4, wherein the threshold amount of the rotation component is set based on (b) the detected first posture information of the image sensor.

7. A non-transitory computer-readable storage medium storing a control program causing a computer to execute a control method of controlling an image processing apparatus, the control method comprising:
   continuously photographing a plurality of images using an image sensor while the image sensor moves in a panning direction;
   detecting first posture information of the image sensor just before the continuous photographing to produce a detected first posture information;
   cropping a predetermined area from each image of the plurality of images to produce a plurality of cropped predetermined areas;
   detecting at least one of angular velocity information and second posture information of the image sensor during the continuous photographing to produce a detected at least one of angular velocity information and second posture information of the image sensor;
   detecting a positional displacement between the predetermined area cropped from adjacent images, among the plurality of images, based on the detected at least one of the angular velocity information and the second posture information of the image sensor to produce a detected positional displacement between the predetermined area cropped from adjacent images;
   calculating an amount of a rotation component of each of the plurality of cropped predetermined areas based on the detected at least one of the angular velocity information and the second posture information of the image sensor to produce a calculated amount of the rotation component;
   setting a threshold amount of a rotation component based on one of (a) the detected at least one of the angular velocity information and the second posture information of the image sensor, and (b) the detected first posture information of the image sensor; and
   generating a wide angle image by compositing the plurality of cropped predetermined areas, wherein the compositing includes successively adding, beginning with an initial predetermined cropped area as a preceding predetermined cropped area, each of the plurality of cropped predetermined areas to an edge of the preceding predetermined cropped area while correcting the detected positional displacement of each of the plurality of cropped predetermined areas, wherein, in a case in which the amount of the rotation component for a cropped predetermined area, of the plurality of cropped predetermined areas, is greater than the threshold amount of the rotation component, the detected positional displacement of the cropped predetermined area is corrected by rotating the cropped predetermined area by the threshold amount of the rotation component, and, in a case in which the amount of the rotation component for a cropped predetermined area, of the plurality of cropped predetermined areas, is equal to or less than the threshold amount of the rotation component, the detected positional displacement of the cropped predetermined area is corrected by rotating the cropped predetermined area by the amount of the rotation component.

8. The non-transitory computer-readable storage medium according to claim 7, wherein the control method further comprises changing the threshold amount of the rotation component based on the detected at least one of the angular velocity information and the second posture information.

9. The non-transitory computer-readable storage medium according to claim 7, wherein the threshold amount of the rotation component is set based on (b) the detected first posture information of the image sensor.

\* \* \* \* \*